(12) United States Patent
Jackson et al.

(10) Patent No.: US 10,662,666 B2
(45) Date of Patent: May 26, 2020

(54) SWIMMING POOL SKIMMER INCLUDING SLIDABLE WEIR GATE AND RELATED METHODS

(71) Applicant: JACKSON POOLS, INC., Fort Myers, FL (US)

(72) Inventors: Chad Jackson, Fort Myers, FL (US); Richard Cox, Fort Myers, FL (US)

(73) Assignee: Jackson Pools, Inc., Fort Myers, FL (US)

( * ) Notice: Subject to any disclaimer, the term of this patent is extended or adjusted under 35 U.S.C. 154(b) by 35 days.

(21) Appl. No.: 15/987,633

(22) Filed: May 23, 2018

(65) Prior Publication Data
US 2019/0360227 A1    Nov. 28, 2019

(51) Int. Cl.
*E04H 4/12* (2006.01)
*C02F 1/40* (2006.01)
*C02F 103/42* (2006.01)

(52) U.S. Cl.
CPC ............. *E04H 4/1272* (2013.01); *C02F 1/40* (2013.01); *C02F 2103/42* (2013.01)

(58) Field of Classification Search
CPC ... E04H 4/1209; E04H 4/1263; E04H 4/1272; C02F 2103/42
USPC .......... 210/776, 122, 167.1, 167.12, 167.18, 210/167.19, 242.1, 416.2; 4/490, 496, 4/507, 509
See application file for complete search history.

(56) References Cited

U.S. PATENT DOCUMENTS

| | | | |
|---|---|---|---|
| 3,212,268 A * | 10/1965 | Ortega | E04H 4/1272 210/167.12 |
| 3,252,576 A * | 5/1966 | Miller | E04H 4/1209 210/167.12 |
| 3,815,161 A | 6/1974 | Baker | |
| 4,212,740 A | 7/1980 | Greene | |
| 4,454,035 A | 6/1984 | Stefan | |
| 4,498,984 A | 2/1985 | Colson | |
| 5,078,863 A * | 1/1992 | Durigon | E04H 4/1263 210/167.12 |
| 5,378,376 A * | 1/1995 | Zenner | B01D 21/22 210/776 |
| 5,642,534 A * | 7/1997 | Sanchez | E04H 4/1218 210/242.1 |
| 7,306,718 B2 | 12/2007 | Gardenier | |
| 7,402,242 B2 | 7/2008 | Duckett | |
| 8,034,236 B1 * | 10/2011 | Happel | E03F 5/14 210/242.1 |

(Continued)

OTHER PUBLICATIONS

Watkins 31680 Skimmer Weir W/ Wheels Hot Spring; retrieved from internet on Jun. 8, 2018; 5 pages; web address: https://www.ebay.com/p/Watkins-31680-Skimmer-Weir-W-Wheels-Hot-Spring/20007547946.

(Continued)

*Primary Examiner* — Christopher Upton
(74) *Attorney, Agent, or Firm* — Allen, Dyer, Doppelt & Gilchrist, P.A. Attorneys at Law

(57) ABSTRACT

A skimmer for a swimming pool may include a skimmer housing having a water inlet opening coupled to an aperture in a wall of the swimming pool at a waterline thereof. The skimmer may also include a weir gate slidably moveable relative to the water inlet opening between open position and a closed position blocking the water inlet opening.

26 Claims, 9 Drawing Sheets

(56) References Cited

U.S. PATENT DOCUMENTS

2017/0175410 A1    6/2017   Smith

OTHER PUBLICATIONS

Skimmer Weir w/Wheels, Hot Spring; retrieved from Internet on Jun. 8, 2018; 4 pages; web address: http://www.backyardplus.com/proddetail.php?prod=31680&cat=207.
Jackson et al.; U.S. Appl. No. 29/648,743, filed May 23, 2018.

* cited by examiner

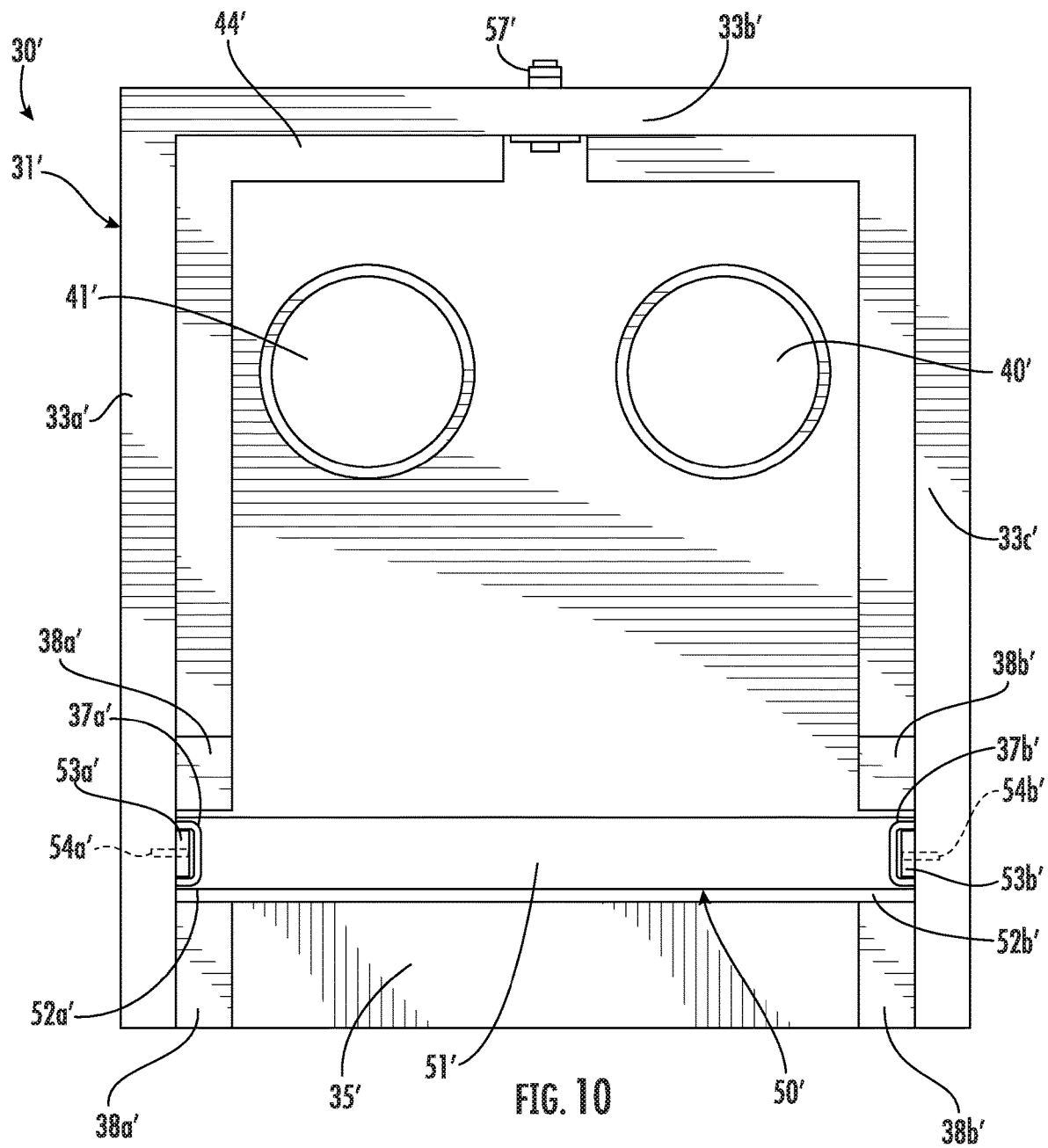

US 10,662,666 B2

SWIMMING POOL SKIMMER INCLUDING SLIDABLE WEIR GATE AND RELATED METHODS

TECHNICAL FIELD

The present invention relates to the field of swimming pools, and more particularly, to swimming pool skimmers and related methods.

BACKGROUND

A swimming pool is a relatively popular structure for swimming or other leisure activities. To maintain a swimming pool in a relatively sanitary and clean condition, it is typically desirable to operate a filter system to remove pollutants or contaminants from the water of the swimming pool.

One part of a swimming pool filter system is a skimmer. A typical skimmer draws water from the swimming pool through an opening on the wall of swimming pool. Access to the skimmer may be provided from above through pool decking, for example. During operation, a filter pump draws water from the swimming pool over a floating hinged weir. The floating hinged weir typically is hinged and biased in vertical position. Suction from the pump causes the weir to rotate about the hinge away from the swimming pool. Thus, the skimmer may reduce the amount of collected debris from flowing back into the swimming pool.

A typical skimmer also has a removable skimmer basket. During operation, larger debris are collected in the skimmer basket, while smaller debris pass through to the filter pump.

SUMMARY

A skimmer for a swimming pool may include a skimmer housing having a water inlet opening coupled to an aperture in a wall of the swimming pool at a waterline thereof. The skimmer may also include a weir gate slideably moveable relative to the water inlet opening from an open position to a closed position blocking the water inlet opening.

The skimmer housing may have first and second vertical passageways adjacent opposing ends of the water inlet opening to slidably receive the weir gate therein, for example. The weir gate may include a weir gate body having opposing first and second ends and a plurality of first and second protruding bodies extending from the first and seconds ends within the first and second vertical passageways, respectively.

The plurality of first and second protruding bodies may include a plurality of first and second rollers, for example. The weir gate body may have at least one first and second slots within the opposing first and second ends, respectively, and the weir gate may further include at least one further first and second rollers carried respectively within the at least one first and second slots.

The skimmer housing may have a plurality of first and second protruding bodies extending inwardly adjacent opposing ends of the water inlet opening. The weir gate may include a weir gate body having first and second vertical passageways within opposing first and second ends, respectively, to receive the plurality of first and second protruding bodies therein, for example.

The skimmer housing may have at least one water outlet opening therein coupled to a filter pump, for example. The skimmer housing may have an inwardly extending lip below the water inlet opening, and wherein the skimmer may further include a filter basket carried by the inwardly extending lip.

A method aspect is directed to a method of skimming a swimming pool. The method may include operating a filter pump coupled to a skimmer that includes to a skimmer housing having a water inlet opening coupled to an aperture in a wall of the swimming pool at a waterline thereof and a weir gate carried by the skimmer housing. Operation of the filter pump may cause the weir gate to slidably move relative to the water inlet opening between an open position and a closed position blocking the upper water opening.

Another method aspect is directed to a method of making a skimmer for a swimming pool. The method may include forming a skimmer housing to have a water inlet opening coupled to an aperture in a wall of the swimming pool at a waterline thereof. The method may also include coupling a weir gate to the skimmer housing so that the weir gate is slideably moveable relative to the water inlet opening between an open position and a closed position blocking the upper water opening.

BRIEF DESCRIPTION OF THE DRAWINGS

FIG. 10 is a top view of a skimmer according to another embodiment.

DETAILED DESCRIPTION

Figure 1:
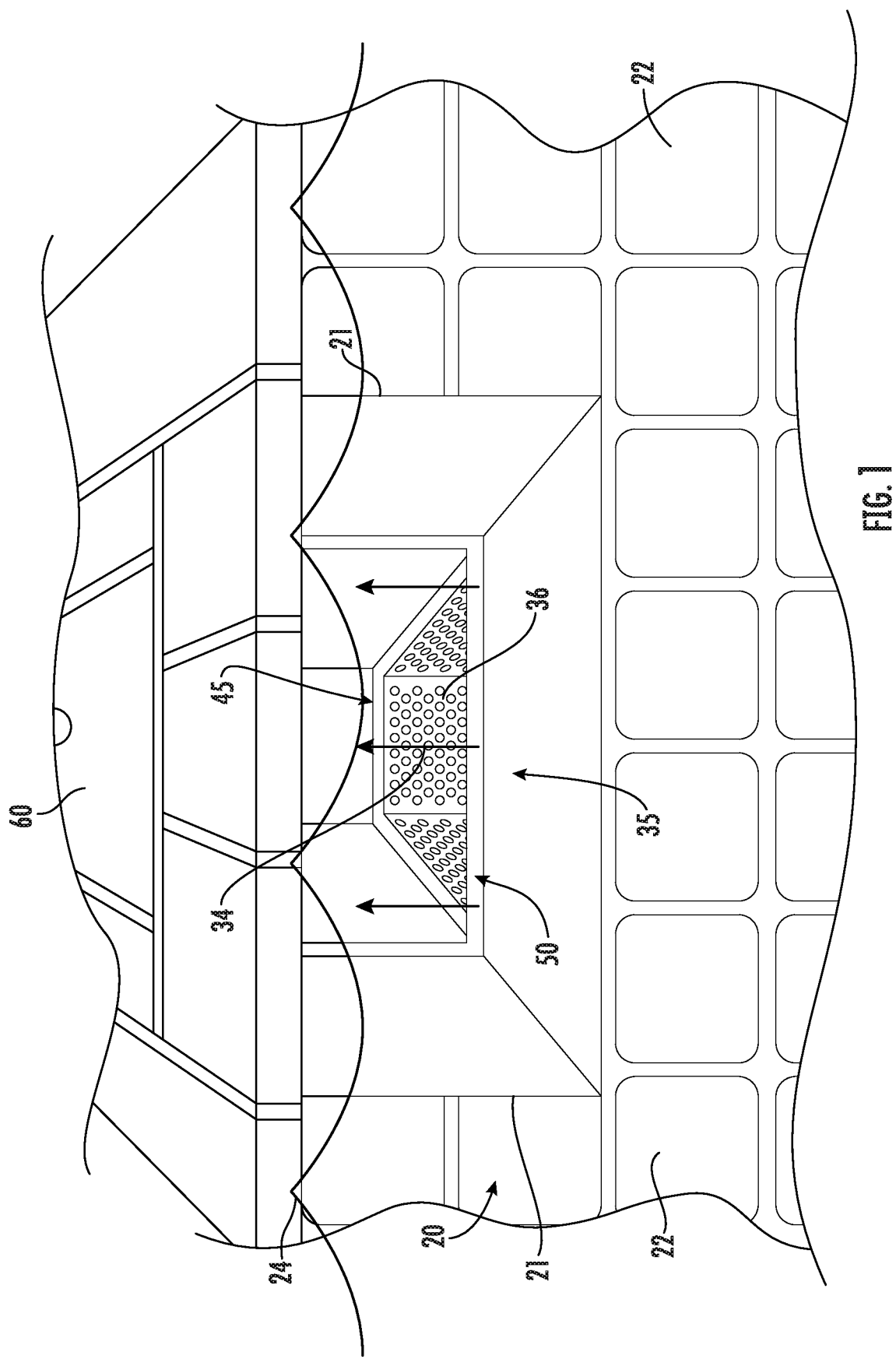
FIG. 1 is a perspective view of a swimming pool with a skimmer according to an embodiment.
Figure 2:
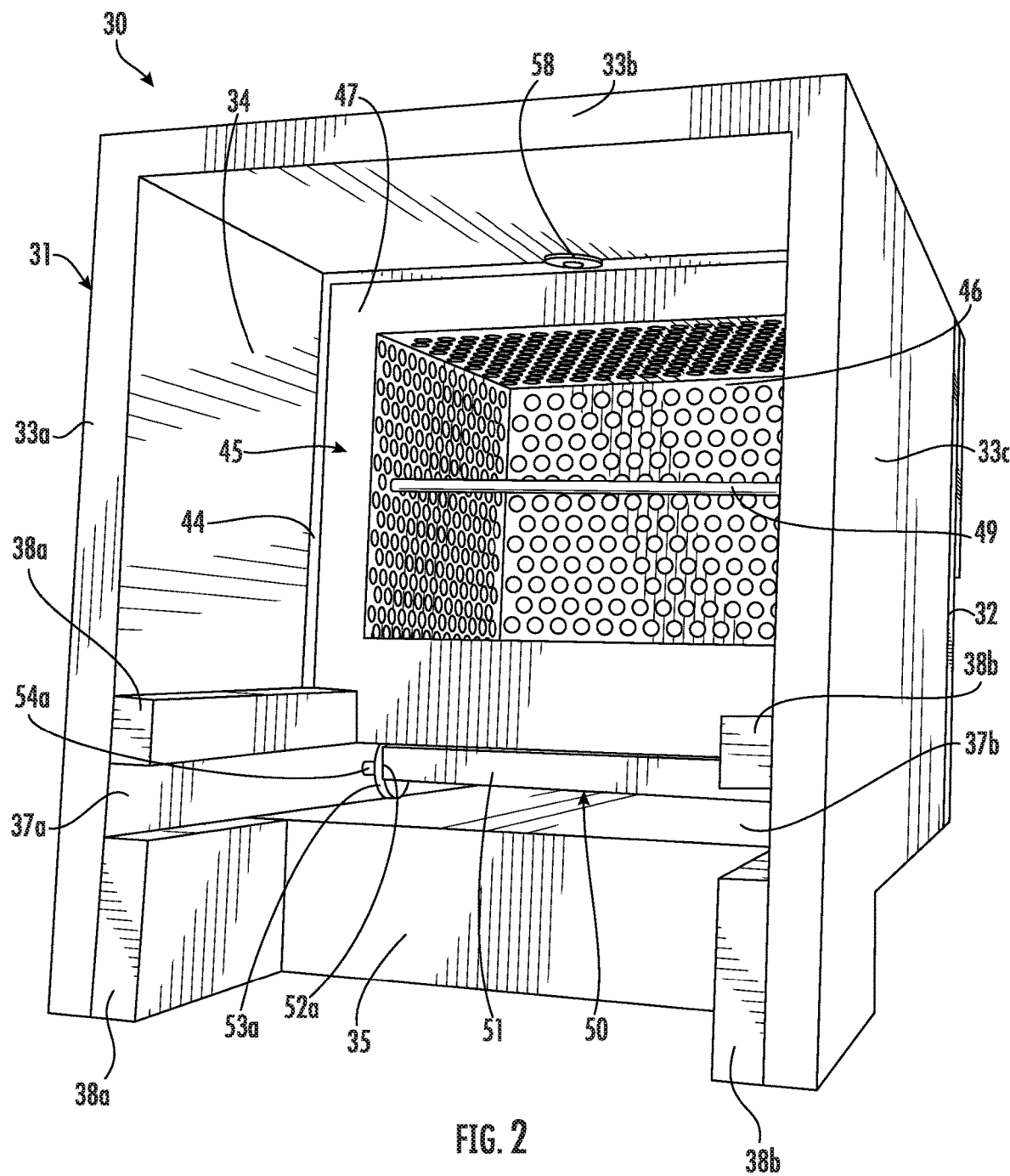
FIG. 2 is a top perspective view of the skimmer of FIG. 1 with the cover removed.
Figure 3:
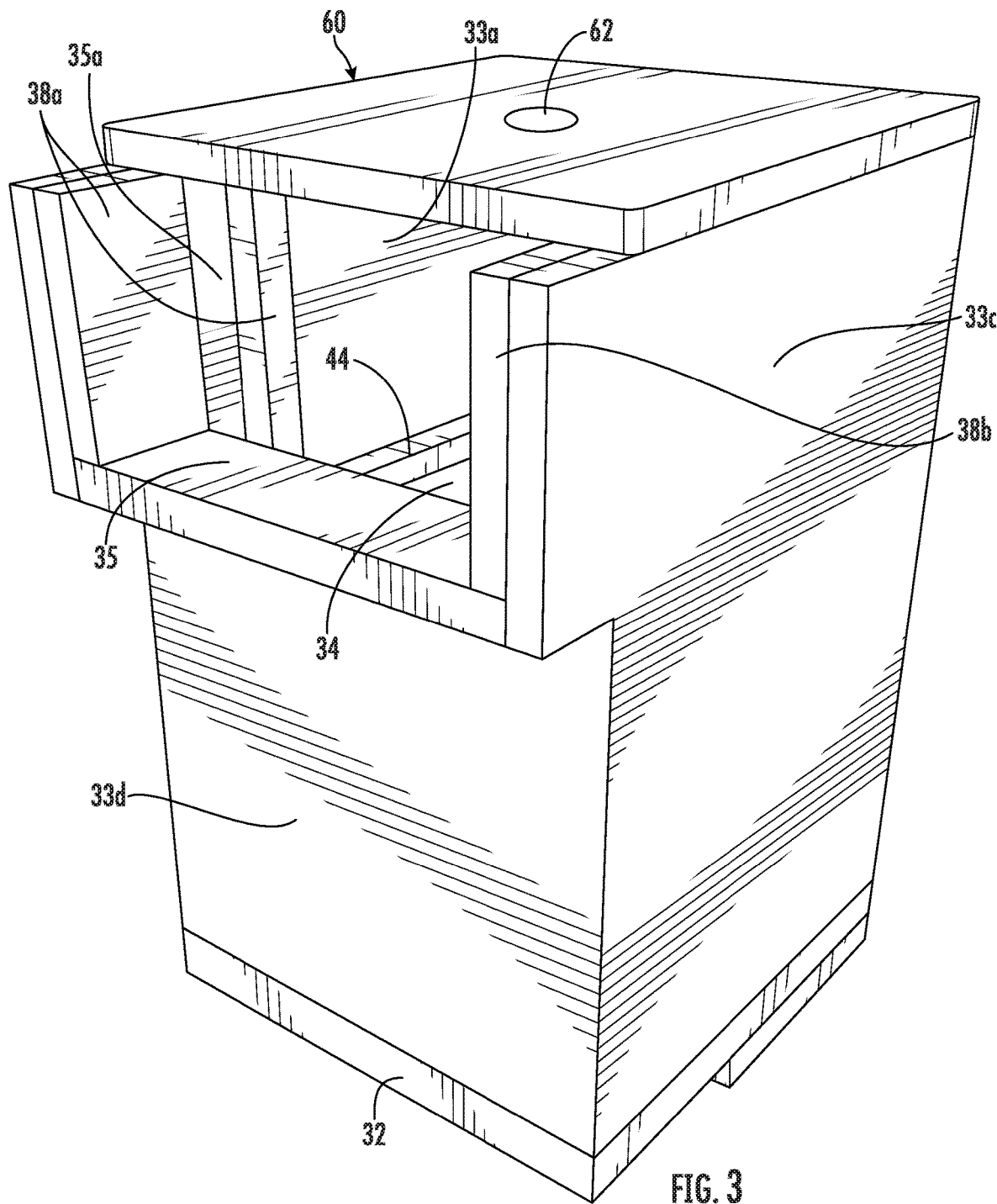
FIG. 3 is a front perspective view of the skimmer of FIG. 2 with the weir gate and filter basket removed.
Figure 4:
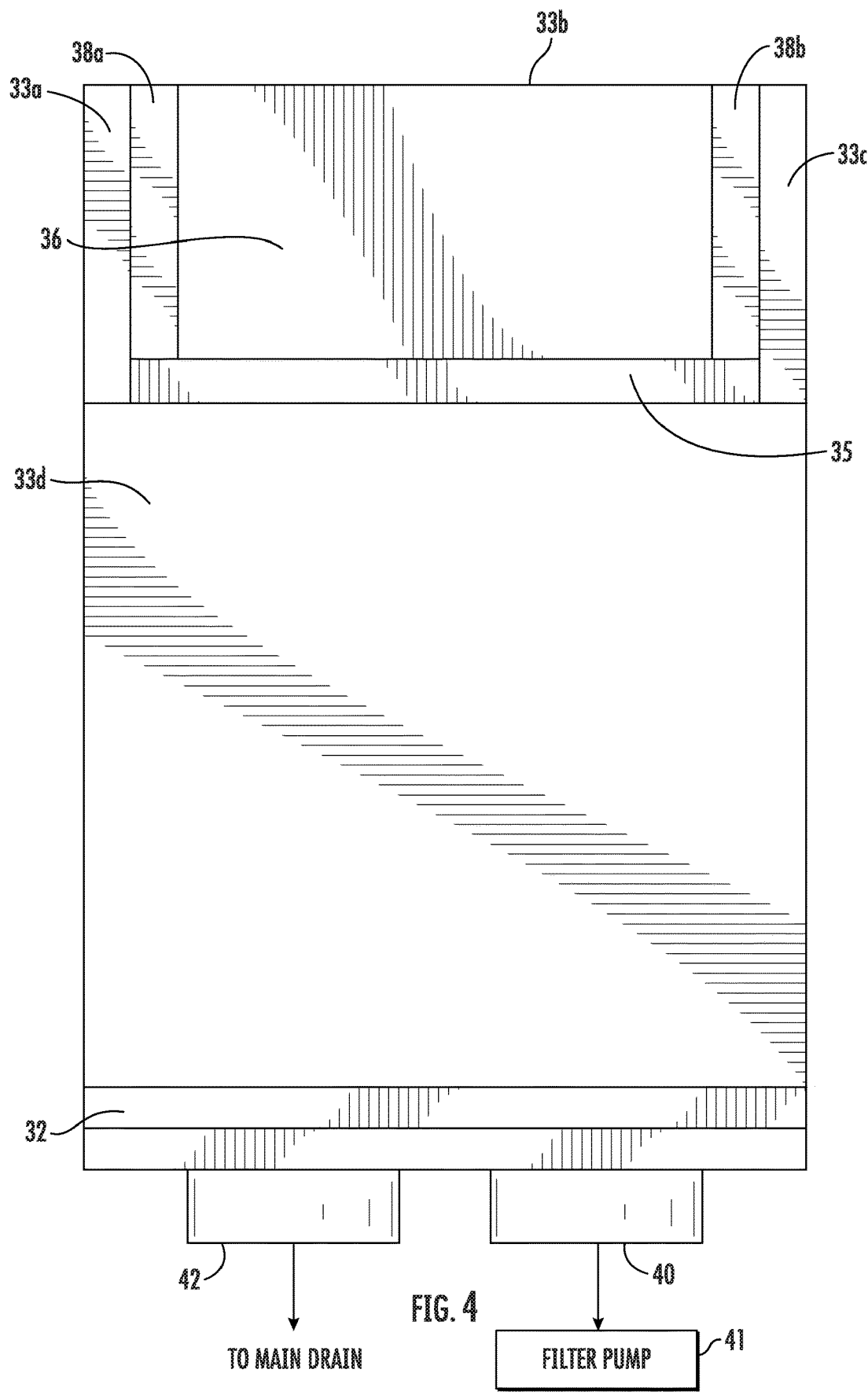
FIG. 4 is a front view of the skimmer of FIG. 2.
Figure 5:
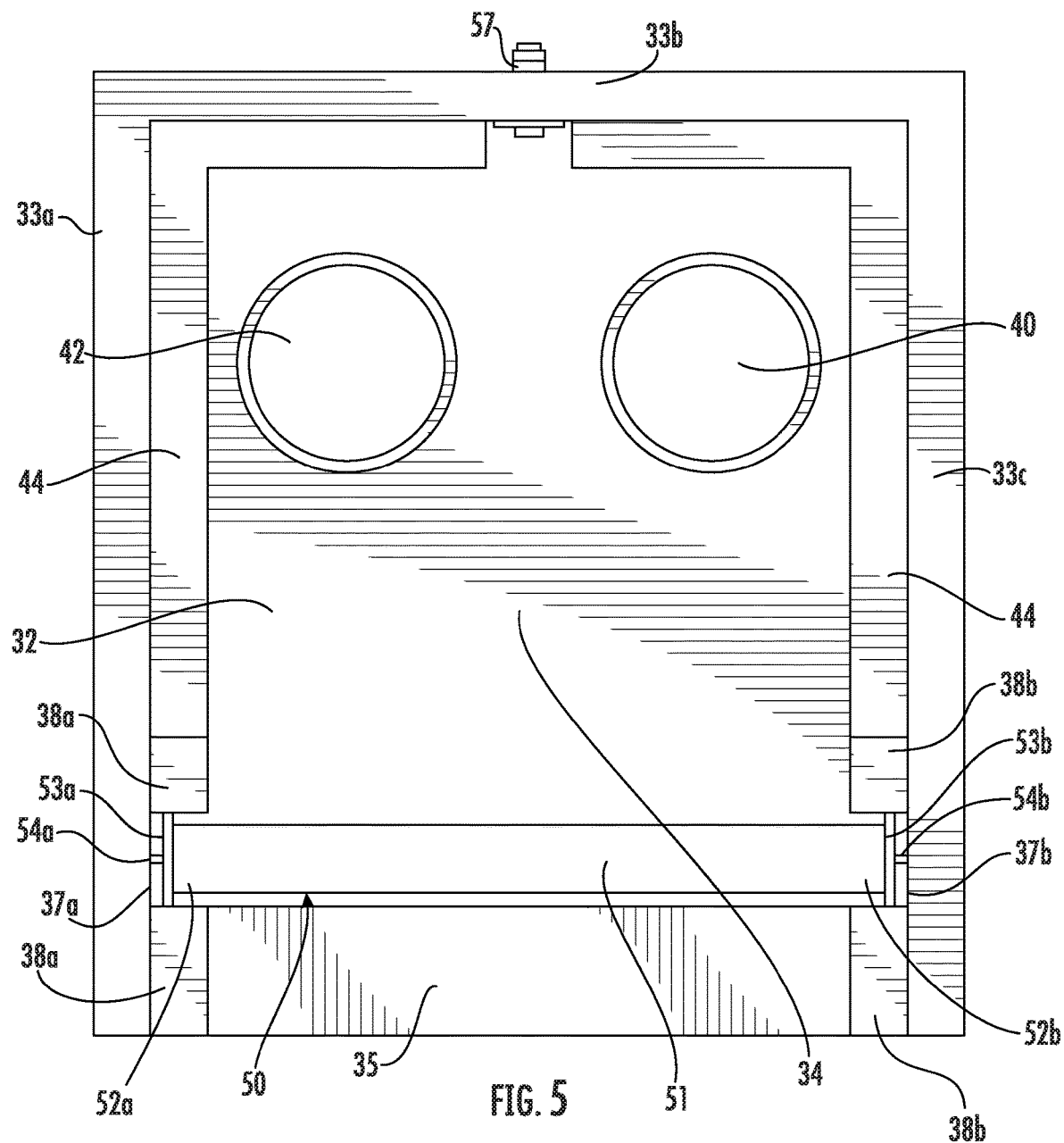
FIG. 5 is a top view of the skimmer of FIG. 2 with the skimmer basket removed.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-5, a skimmer 30 for a swimming pool 20 illustratively includes a skimmer housing 31. The skimmer housing 31 has a base 32 and sidewalls 33a-33d extending upwardly from the base defining a well area 34. The sidewall 33b or back wall may include a grounding plate 58 therein, as will be appreciated by those skilled in the art.

The skimmer housing 31, and more particularly, the sidewall 33d, has a water inlet opening 36 coupled, for example, in fluid communication, to an aperture 21 in a wall 22 of the swimming pool 20 at a waterline 24 thereof. The water inlet opening 36 is adjacent the top of the skimmer housing 31. The sidewalls 33a, 33c each have an enlarged upper end (e.g., to define an L-shape) adjacent the water inlet opening 36 and coupled to an inlet opening lip 35 to define a water inlet passageway to the well area. The water inlet opening 36 may be another shape and may match the shape of the aperture 21 in the wall 22 of the swimming pool 20. The sidewalls 33a, 33c each have an enlarged thickness portion 38a, 38b from the aperture 21 in the wall 22 of the swimming pool 20 to the skimmer well area 34.

As will be appreciated by those skilled in the art, during normal operation of the swimming pool 20, the waterline 24 extends to about halfway within the water inlet opening 36. Indeed, while the skimmer housing 31 has been described as being rectangular in shape, it will be appreciated by those skilled in the art that there may be a single round sidewall defining a cylindrical well coupled to a water inlet passageway, which may be rectangular in shape.

The skimmer housing 31 also includes a water outlet opening 40 adjacent the bottom, and more particularly, in the base 32. The water outlet opening 40 is coupled to a filter pump 41 by way of piping. The filter pump 41 provides suction or pumps water from the swimming pool through the skimmer 30 for filtering and returns the filtered water the swimming pool through a water jet or other water outlet remote from the skimmer.

In some embodiments, the skimmer housing 31 may include further openings in the well area or base 31. For example, an opening 42 may be coupled to the main drain (e.g., and provide water flow from the main drain) of the swimming pool 20 to define a hydrostatic relief value. Another opening may be an adjustable flow opening coupled to the main drain (e.g., and provide water flow from the main drain). Other and/or additional valves and/or openings may be within the well area 34 including the base 32 and/or a sidewall 33a-33d.

Figure 6:
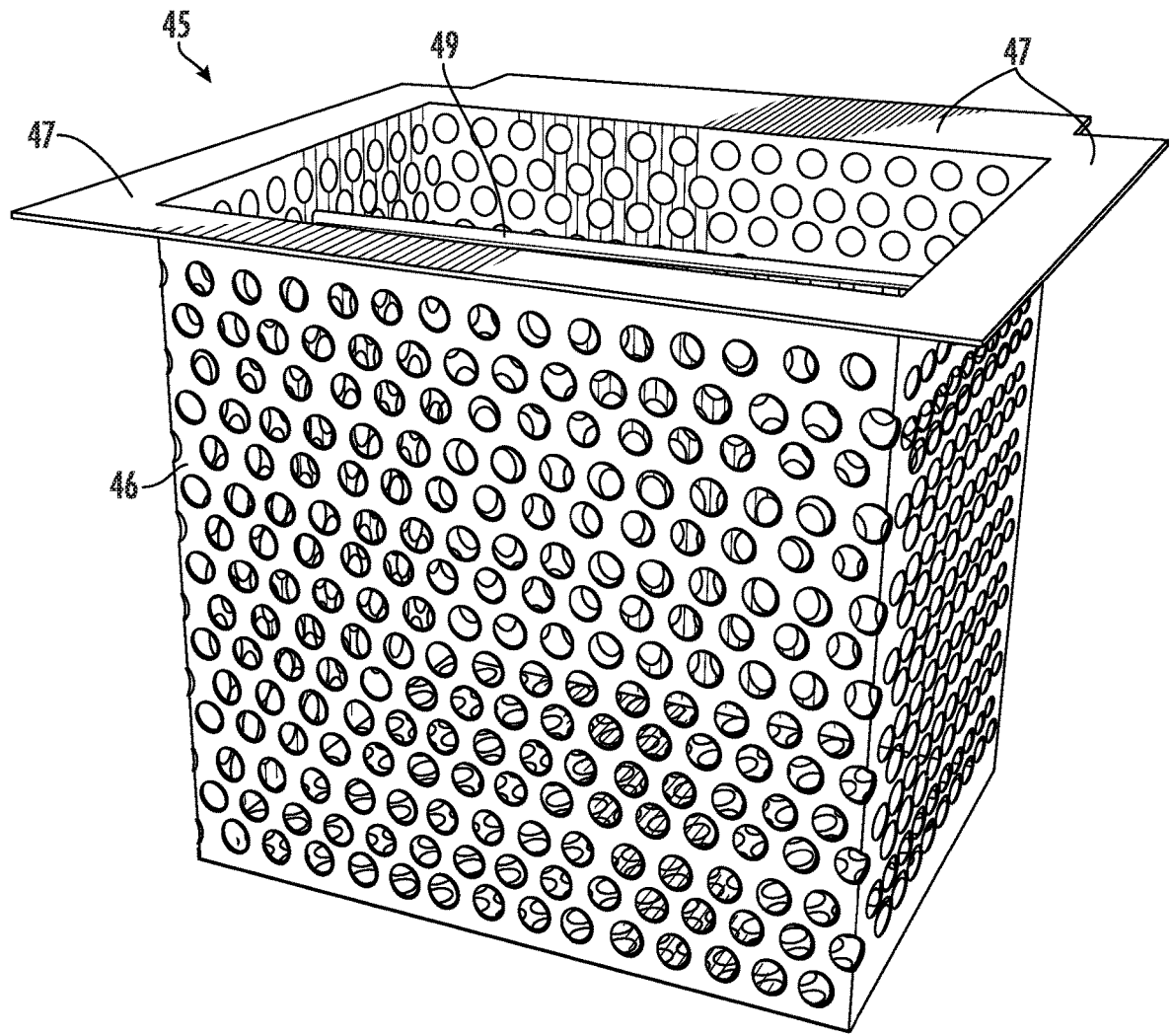
FIG. 6 is an enlarged perspective view of the skimmer basket of the skimmer of FIG. 2.

Referring now additionally to FIG. 6, the skimmer housing 31 also has an inwardly extending lip 44 below the water inlet opening 36. A filter basket 45 is carried by the inwardly extending lip 44. The filter basket 45 illustratively includes a mesh basket body 46 and a basket lip 47 that extends outwardly from the mesh basket body so that when the filter basket is positioned within the well area 34, the basket lip rests on the inwardly extending lip 44. A filter basket handle 49 extends across the mesh basket body 46 to facilitate removal. The filter basket 45 may be stainless steel or plastic, for example. The filter basket 45 may be another material or include different types of materials. Debris is collected in the filter basket 45 based upon the flow of water therethrough and is removable for cleaning.

The skimmer housing 31 illustratively has first and second vertical passageways 37a, 37b adjacent opposing ends of the water inlet opening 36 to slidably receive a weir gate 50 therein. The first and second vertical passageways 37a, 37b are defined within the enlarged thickness portions 38a, 38b of the sidewalls 33a, 33c. It should be understood that while the vertical passageways need not be perpendicular to the water, but rather transverse thereto. The weir gate 50 is slideably and buoyantly moveable relative to the water inlet opening 36. The weir gate 50 moves, for example, based upon the waterline or water level and amount of pressure from the filter pump 41, between an open position whereby the flow of water through the water inlet opening 36 and the water inlet passageway to the well area 34 is unimpeded to a closed position blocking the upper water opening.

Figure 7:
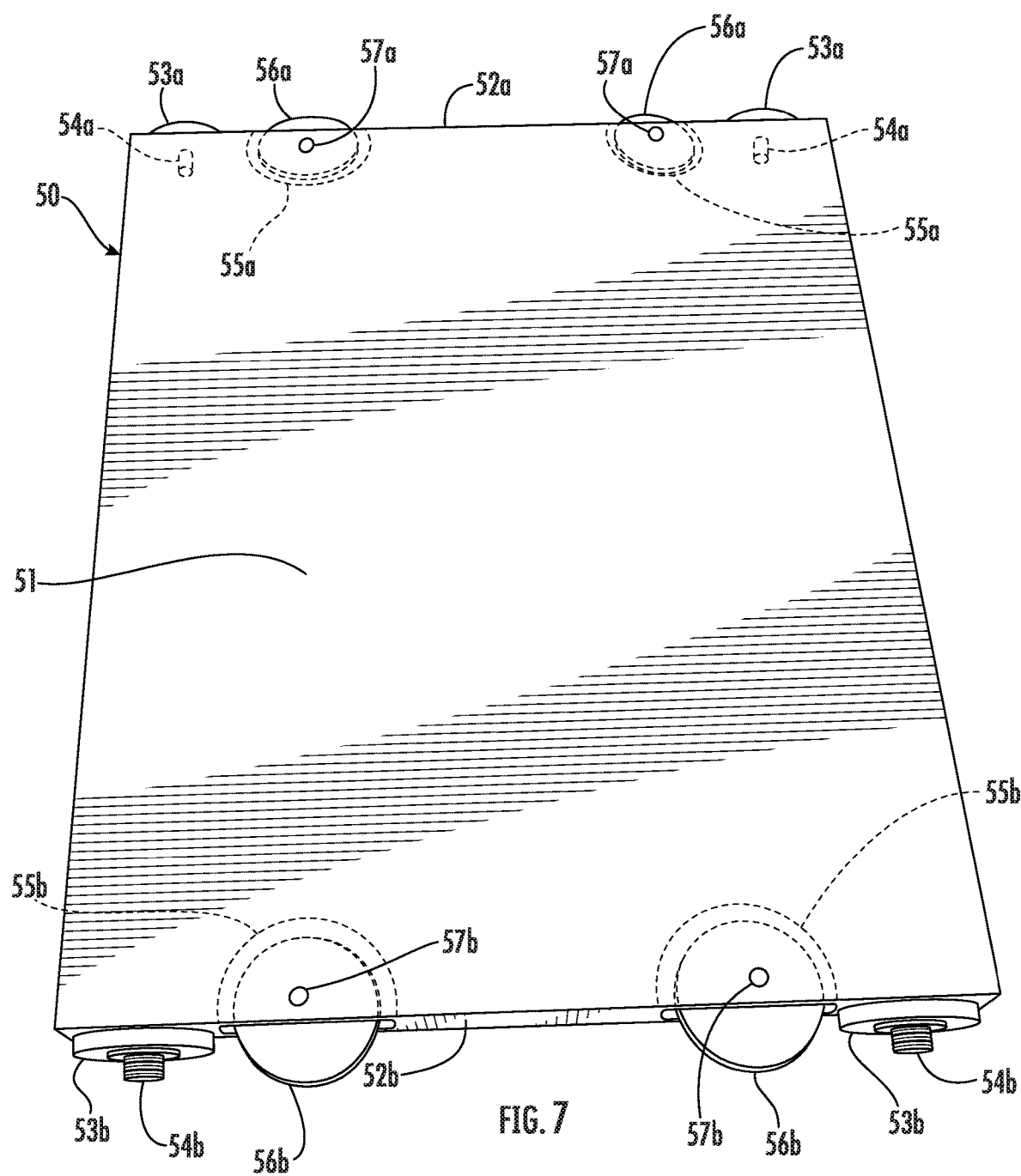
FIG. 7 is a perspective view of the weir gate of the skimmer of FIG. 2.

Referring now additionally to FIG. 7, the weir gate 50 illustratively includes a weir gate body 51 having opposing first and second ends 52a, 52b. First and second protruding bodies 53a, 53b extend from the first and seconds ends 52a, 52b within the first and second vertical passageways 37a, 37b, respectively. Illustratively, the first and second protruding bodies 53a, 53b are in the form of first and second rollers or wheels. The first and second rollers 53a, 53b are secured to the first and second ends 52a, 52b by a respective fastener 54a, 54b or screw that permits the roller to rotate thereabout. The first and second vertical passageways 37a, 37b are sized to fit the first and second rollers 53a, 53b. While two rollers 53a, 53b are coupled to each end 52a, 52b, it will be appreciated that there may be any number of rollers coupled to each end. In some embodiments, there may be no rollers and/or the protruding bodies 53a, 53b may be in another form.

The weir gate body 51 also includes first and second slots 55a, 55b within the opposing first and second ends 52a, 52b adjacent the top and bottom sides of the weir gate body, and more particularly, the first and second rollers 53a, 53b. Further first and second protrusions 56a, 56b are carried within the first and second slots 55a, 55b, respectively. The first and second further protrusions 56a, 56b are also illustratively in the form of rollers or wheels. A respective fastener or axle 57a, 57b that extends from the front side of the weir gate body 51 to the back side of the weir gate body secures the further rollers 56a, 56b to weir gate body so that a portion of each roller extends from the respective end. The further rollers 56a, 56b are thus transverse to the rollers 53a, 53b as is their rotation. In some embodiments, the weir gate body 51 may include only first and second rollers 53a, 53b or further first and second rollers 56a, 56b.

Figure 8:
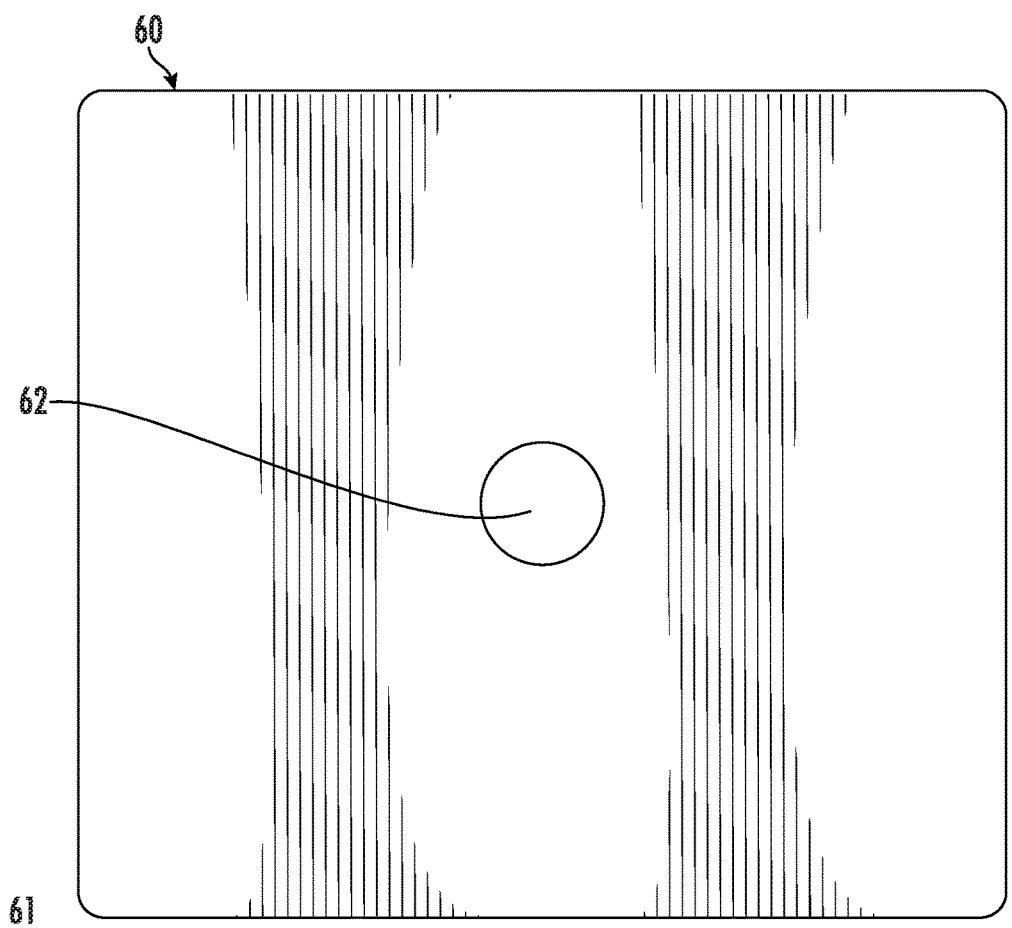
FIG. 8 is a top view of the cover of the skimmer of FIG. 3.
Figure 9:
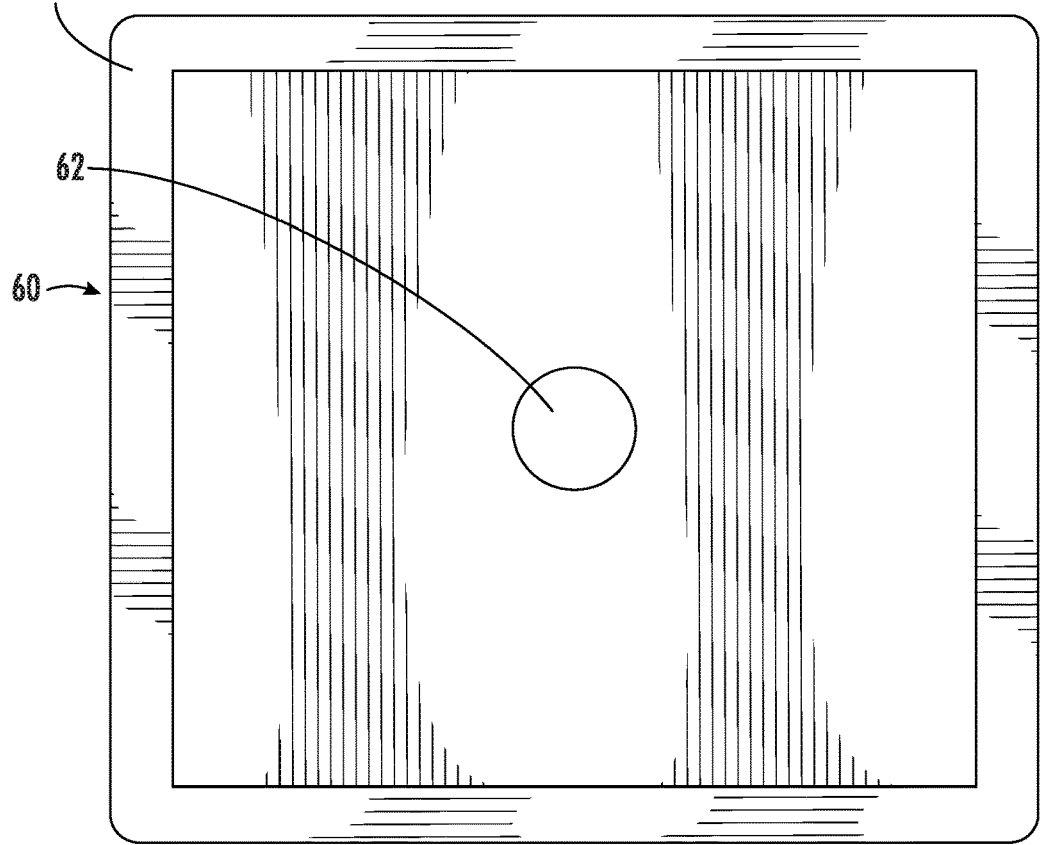
FIG. 9 is a bottom view of the cover of FIG. 8.

Referring now additionally to FIGS. 8 and 9, a cover 60 is to be carried by the top of the sidewalls 33a-33d over the well area 34. The cover 60 illustratively includes a recessed perimeter 61 sized to a thickness of the sidewalls 33a-33d. The cover 60 may have an opening 62 therein to permit a user to remove the cover from the skimmer housing 31.

The skimmer 30 including the skimmer housing 31 and the weir gate 50 may be formed of a plastic material, e.g., polyvinyl chloride, acrylic, etc. In some embodiments, the skimmer 30 and its components may be made of a different material or materials, e.g., stainless steel.

During operation, when the filter pump 41 is in the off position or not operational, the weir gate 50 buoyantly floats upwardly in the vertical passageways 37a, 37b (i.e., upwardly biased) to close the water inlet opening 36. Thus, the weir gate 50 acts as a dam holding water from the swimming pool body from within the well area 34. This is particularly advantageous in that debris are maintained within the well area 34 during off periods of the filter pump 41. When the filter pump 41 is operational, suction from the filter pump through the water outlet openings 40, 42 (e.g., the pump return and main drain) causes water to flow from the swimming pool 20 through the water inlet passageway to the well area 34. Water is able to flow over the weir gate 50 since the suction from the filter pump 41 causes the weir gate to move downwardly within the vertical passageways 37a, 37b from the closed position. The buoyancy of the weir gate 50 and the suction from the filter pump 41 works together so that the weir gate effectively acts as a biasing member or spring. The skimming action or distance between the top of the water and the top of the weir gate 50 remains relatively constant so that skimming occurs no matter what the water level.

A model of the skimmer 30 described herein was built and tested. In the exemplary model, the sidewalls 33a-33c each had a width at a lower end thereof of 1-foot and a height of 1-foot 6.75 inches. The sidewalls 33a, 33c each have an upper width of 1-foot, 8.75 inches to define for the water inlet passageway. The water inlet opening 36 had a height of 5.75 inches and the water inlet lip 35 extended 2.75 inches from the aperture 21 in the wall of the pool 20 to the weir gate 50. The thickness of the sidewalls 33a-33d was 0.75 inches. The vertical passageways 37a, 37b each had a depth of 0.75 inches formed within a 0.75-inch buildup within the inside of the sidewalls 33a, 33c. Thus, the water inlet opening 36 had a width of 9-inches. The weir gate 50 had a thickness of 1 3/16 inches, and the buildup extended behind the weir gate (well area side) was 1-inch. The weir gate 50 was 8-inches in height and 10-inches wide. Each of rollers 53a, 53b, 56a, 56b had a diameter of 1.25-inches and a thickness of 0.25-inches. The recesses 55a, 55b each were sized at 1.375-inches.

Tests using the above-sized skimmer were performed. During no filter pump operation (i.e., pump off), the weir gate top was level with the top of the skimmer housing 31 (i.e., fully closed position) while the water level 24 inside the well area 34 was 0.5-inches above the top of the filter basket. During operation of one filter pump 41 operating at a flow rate of 78 gallons per minute, the weir gate 50 moved downwardly 2-inches from its topmost position, while the water level 24 within the well area 34 was 3.25 inches from the top of the skimmer housing 31. During operation of two filter pumps, the weir gate 50 was 2.5 inches from the top of the skimmer housing 31 or its topmost position, and the water level 24 within the well area 34 was 3.75 inches below the top of skimmer housing. Advantageously, as will be appreciated by those skilled in the art, the skimmer 30 may provide increased skimming at any or varying water levels and under any pump conditions (e.g., number of pumps, pressure, flow rate, etc.).

Referring now to FIG. 10, in another embodiment, the skimmer housing 31' has first and second protruding bodies 53a', 53b', which may be in the form of rollers, that extend inwardly adjacent opposing ends 52a', 52b' of the water inlet opening 36'. The weir gate body 51' thus has first and second vertical passageways 37a', 37b' or slots within the opposing first and second ends 52a', 52b', respectively, to receive the first and second protruding bodies 53a', 53b' therein. In other words, in the present embodiment, the rollers 53a', 53b' are coupled to the skimmer housing 31'. Further protrusions or rollers may also be included.

A method aspect is directed to a method of skimming a swimming pool 20. The method includes operating a filter pump 41 coupled to a skimmer 30 that includes to a skimmer housing 31 having a water inlet opening 36 coupled to an aperture 21 in a wall 22 of the swimming pool 20 at a waterline 24 thereof and a weir gate 50 carried by the skimmer housing. Operation of the filter pump 41 causes the weir gate 50 to slidably move relative to the water inlet opening 36 between an open position and a closed position blocking the water opening.

Another method aspect is directed to a method of making a skimmer 30 for a swimming pool 20. The method includes forming a skimmer housing 31 to have a water inlet opening 36 coupled to an aperture 21 in a wall 22 of the swimming pool 20 at a waterline 24 thereof. The method also includes coupling a weir gate 50 to the skimmer housing 30 so that the weir gate is slideably moveable relative to the water inlet opening 36 between an open position and a closed position blocking the water inlet opening.

While the embodiment described herein have been described with respect to a swimming pool, it will be appreciated that in some embodiments, the system may particularly useful for other applications, for example, a spa, pond, fountain, tank (of water or other liquid, e.g., petroleum based), piping, etc. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A skimmer for a swimming pool comprising:
    a skimmer housing having a water inlet opening coupled to an aperture in a wall of the swimming pool at a waterline thereof, and having first and second opposing vertical passageways adjacent the water inlet opening; and
    a weir gate carried by the skimmer housing and slideably moveable between an open position and a closed position blocking the water inlet opening, said weir gate comprising
        a weir gate body having opposing ends and opposing upstream and downstream sides, and
        a plurality of rollers extending from each of the opposing ends within respective ones of the first and second vertical passageways, each of said plurality of rollers having an axis of rotation offset from a center position of a respective one of the opposing ends between the upstream and downstream sides so that each roller extends outwardly beyond at least one of the upstream and downstream sides.

2. The skimmer of claim 1 wherein the weir gate body has at least one slot within each of the opposing ends; and wherein the weir gate further comprises a further roller carried within each of the at least one slots.

3. The skimmer of claim 1 wherein the skimmer housing has at least one water outlet opening therein coupled to a filter pump.

4. The skimmer of claim 1 wherein the skimmer housing has an inwardly extending lip below the water inlet opening; and wherein the skimmer further comprises a filter basket carried by the inwardly extending lip.

5. The skimmer of claim 1 wherein at least one of said skimmer housing and said weir gate comprises polyvinyl chloride.

6. A skimmer for a swimming pool comprising:
    a skimmer housing having a water inlet opening coupled to an aperture in a wall of the swimming pool at a waterline thereof, and having first and second vertical passageways adjacent the water inlet opening, the skimmer housing also having at least one water outlet opening therein coupled to a filter pump; and
    a weir gate carried within the first and second vertical passageways and moveable between an open position and a closed position blocking the water inlet opening, said weir gate comprising
        a weir gate body having opposing ends and opposing upstream and downstream sides, and
        a plurality of rollers extending from each of the opposing ends within respective ones of the first and second vertical passageways, each of said plurality of rollers having an axis of rotation offset from a center position of a respective one of the opposing ends between the upstream and downstream sides so that each roller extends outwardly beyond at least one of the upstream and downstream sides, and each of said plurality of rollers having a diameter greater than a width of each opposing end between the upstream and downstream sides.

7. The skimmer of claim 6 wherein the weir gate body has at least one slot within each of the opposing ends; and wherein the weir gate further comprises a further roller carried within each of the at least one slots.

8. The skimmer of claim 6 wherein the skimmer housing has an inwardly extending lip below the water inlet opening; and wherein the skimmer further comprises a filter basket carried by the inwardly extending lip.

9. A method of skimming a swimming pool comprising:
operating a filter pump coupled to a skimmer comprising to a skimmer housing having a water inlet opening coupled to an aperture in a wall of the swimming pool at a waterline thereof and a weir gate carried by the skimmer housing, operation of the filter pump causing the weir gate to slidably move relative to the water inlet opening between an open position and a closed position blocking the water inlet opening, the weir gate comprising a weir gate body having opposing ends and opposing upstream and downstream sides, and a plurality of rollers extending from each of the opposing ends within respective first and second vertical passageways within the skimmer housing, each of the plurality of rollers having an axis of rotation offset from a center position of a respective one of the opposing ends between the upstream and downstream sides so that each roller extends outwardly beyond at least one of the upstream and downstream sides.

10. The method of claim 9 wherein the weir gate body has at least one slot within each of the opposing ends; and wherein the weir gate further comprises a further roller carried within each of the at least one slots.

11. The method of claim 9 wherein the weir gate body has at least one first and at least one second slots within the opposing first and second ends, respectively; and wherein the weir gate further comprises at least one respective further roller carried within the at least one first and the at least one second slots.

12. A method of making a skimmer for a swimming pool comprising:
forming a skimmer housing to have a water inlet opening coupled to an aperture in a wall of the swimming pool at a waterline thereof, and to have first and second opposing vertical passageways adjacent the water inlet opening; and
positioning a weir gate within the skimmer housing so that the weir gate is slideably moveable relative to the water inlet opening between an open position and a closed position blocking the water inlet opening, the weir gate comprising a weir gate body having opposing ends and opposing upstream and downstream sides, and a plurality of rollers extending from each of the opposing ends within respective ones of the first and second vertical passageways, each of the plurality of rollers having an axis of rotation offset from a center position of a respective one of the opposing ends between the upstream and downstream sides so that each roller extends outwardly beyond at least one of the upstream and downstream sides.

13. The method of claim 12 wherein the weir gate body has at least one first and at least one second slots within the opposing first and second ends, respectively; and wherein the weir gate further comprises at least one respective further roller carried within the at least one first and the at least one second slots.

14. A skimmer for a swimming pool comprising:
a skimmer housing comprising a plurality of sidewalls defining a skimmer well area, at least one of the plurality of sidewalls having a water inlet opening therein coupling the skimmer well area to an aperture in a wall of the swimming pool at a waterline thereof, and an opposing pair of the plurality of sidewalls having first and second vertical passageways, respectively, adjacent the water inlet opening; and
a weir gate carried by the skimmer housing between the aperture in the wall of the swimming pool and the skimmer well area, the weir gate being slideably moveable between an open position and a closed position blocking the water inlet opening, said weir gate comprising
a weir gate body having opposing ends and opposing sides, and
a plurality of protrusions extending from each of the opposing ends within respective ones of the first and second vertical passageways;
the opposing pair of sidewalls each having an enlarged thickness portion from the aperture in the wall of the swimming pool to the skimmer well area, and the first and second vertical passageways being defined within the enlarged thickness portions.

15. The skimmer of claim 14 wherein the plurality of protrusions comprises a plurality of rollers.

16. The skimmer of claim 14 wherein the weir gate body has at least one first and at least one second slots within the opposing first and second ends, respectively; and wherein the weir gate further comprises at least one respective further protrusion carried within the at least one first and the at least one second slots.

17. The skimmer of claim 14 wherein said skimmer housing has at least one water outlet opening therein coupled to a filter pump.

18. The skimmer of claim 17 wherein said skimmer housing has a further opening coupled to the swimming pool below the waterline.

19. The skimmer of claim 14 wherein said skimmer housing has an inwardly extending lip below the water inlet opening; and wherein the skimmer further comprises a filter basket carried by the inwardly extending lip.

20. The skimmer of claim 19 wherein said filter basket has a plurality of notches therein to accommodate respective enlarged thickness portions of the opposing sidewalls.

21. The skimmer of claim 14 wherein said weir gate comprises polyvinyl chloride.

22. The skimmer of claim 14 wherein said skimmer housing comprises polyvinyl chloride.

23. A method of making a skimmer for a swimming pool comprising:
forming a skimmer housing comprising a plurality of sidewalls defining a skimmer well area, at least one of the plurality of sidewalls having a water inlet opening therein coupling the skimmer well area to an aperture in a wall of the swimming pool at a waterline thereof, and an opposing pair of the plurality of sidewalls having first and second vertical passageways, respectively, adjacent the water inlet opening; and
positioning a weir gate between the aperture in the wall of the swimming pool and the skimmer well area, the weir gate being slideably moveable between an open position and a closed position blocking the water inlet opening, the weir gate comprising a weir gate body having opposing ends and opposing sides, and a plurality of protrusions extending from each of the opposing ends within respective ones of the first and second vertical passageways;

the skimmer housing being formed so that the opposing pair of sidewalls each have an enlarged thickness portion from the aperture in the wall of the swimming pool to the skimmer well area, and so that the first and second vertical passageways are defined within the enlarged thickness portions.

24. The method of claim 23 wherein the plurality of protrusions comprises a plurality of rollers.

25. The method of claim 23 wherein the weir gate body has at least one first and at least one second slots within the opposing first and second ends, respectively; and wherein the weir gate further comprises at least one respective further protrusion carried within the at least one first and the at least one second slots.

26. The method of claim 23 wherein forming the skimmer housing comprises forming at least one water outlet opening therein to be coupled to a filter pump.

* * * * *

UNITED STATES PATENT AND TRADEMARK OFFICE
CERTIFICATE OF CORRECTION

PATENT NO. : 10,662,666 B2
APPLICATION NO. : 15/987633
DATED : May 26, 2020
INVENTOR(S) : Jackson et al.

It is certified that error appears in the above-identified patent and that said Letters Patent is hereby corrected as shown below:

In the Specification

| | |
|---|---|
| Column 3, Line 24 | Insert --to-- after "water" |
| Column 3, Line 28 | Delete: "31"<br>Insert --32-- |
| Column 3, Line 56 | Delete: "while" |
| Column 4, Line 26 | Insert --the-- after "to" |
| Column 5, Line 48 | Delete: "to" after "includes" |
| Column 5, Line 61 | Delete: "30"<br>Insert --31-- |
| Column 5, Line 65 | Delete: "embodiment"<br>Insert --embodiments-- |
| Column 6, Line 1 | Insert --be-- before "particularly" |

In the Claims

| | |
|---|---|
| Column 7, Line 13 Claim 9 | Delete: "to" |
| Column 8, Line 28 Claim 15 | Delete: "comprises"<br>Insert --comprise-- |

Signed and Sealed this
First Day of September, 2020

Andrei Iancu
*Director of the United States Patent and Trademark Office*